(12) United States Patent
Britsch et al.

(10) Patent No.: US 7,080,624 B2
(45) Date of Patent: Jul. 25, 2006

(54) METHOD FOR AVOIDING AN INTERNAL COKING OF AN INJECTION HOLE FOR INJECTION HOLES IN A MULTI-HOLE INJECTION VALVE

(75) Inventors: Heinz Britsch, Bietigheim-Bissingen (DE); Gernot Wuerfel, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/489,741

(22) PCT Filed: Jul. 26, 2002

(86) PCT No.: PCT/DE02/02786

§ 371 (c)(1),
(2), (4) Date: Sep. 28, 2004

(87) PCT Pub. No.: WO03/027473

PCT Pub. Date: Apr. 3, 2003

(65) Prior Publication Data

US 2005/0028782 A1   Feb. 10, 2005

(30) Foreign Application Priority Data

Sep. 15, 2001   (DE) ................. 101 45 580

(51) Int. Cl.
  *F02D 41/40*   (2006.01)
(52) U.S. Cl. ................. 123/299; 123/295
(58) Field of Classification Search ................ 123/294, 123/299, 300, 295
See application file for complete search history.

(56) References Cited

FOREIGN PATENT DOCUMENTS

| DE | 34 46 439 | 6/1986 |
|----|-----------|--------|
| DE | 196 46 651 | 4/1998 |
| DE | 197 47 231 | 4/1999 |
| DE | 198 10 935 | 9/1999 |
| DE | 199 45 813 | 3/2001 |
| EP | 0 361 480 | 4/1990 |
| EP | 0 971 104 | 1/2000 |
| EP | 0 982 489 | 3/2000 |
| EP | 1 028 243 | 8/2000 |
| EP | 1 070 839 | 1/2001 |

OTHER PUBLICATIONS

Friedhelm Hage, "Untersuchung der Einspritzdusenverkokung an einem Personenwagen-Dieselmotor," Motortechnische Zeitschrift, vol. 47, No. 7/8 (1986) pp. 291-292; 295-298.

*Primary Examiner*—T. M. Argenbright
(74) *Attorney, Agent, or Firm*—Kenyon & Kenyon LLP

(57) ABSTRACT

A method for avoiding an injector orifice internal coking of the spray orifices of a multi-orifice fuel injector of a direct injection internal combustion engine, e.g., of a motor vehicle, is provided. Fuel is injected into a combustion chamber of the internal combustion engine by multiple injections. The fuel is injected by a first main injection during the intake stroke and by a subsequent postinjection during the compression stroke before the ignition time. Thereby, during a long operation of the internal combustion engine, especially in a homogeneous operation, the injection time does not have to be continually increased in order to compensate for the increasingly shrinking cross section of the spray orifices.

10 Claims, 6 Drawing Sheets

METHOD FOR AVOIDING AN INTERNAL COKING OF AN INJECTION HOLE FOR INJECTION HOLES IN A MULTI-HOLE INJECTION VALVE

FIELD OF THE INVENTION

The present invention relates to a method for operating a direct injection internal combustion engine, e.g., of a motor vehicle.

BACKGROUND INFORMATION

Direct injection internal combustion engines, in which fuel is injected directly into the combustion chambers of the internal combustion engine, are known in the art. A direct injection internal combustion engine may be operated in different operating modes, for instance, in a stratified operation or a homogeneous operation. Stratified operation is used especially for small loads, whereas homogeneous operation comes into use for greater loads on the internal combustion engine.

In stratified operation, the fuel is injected into the combustion chamber during a compression stroke of the internal combustion engine in such a manner that, at the time of ignition, there is a fuel cloud in the immediate surroundings of a spark plug. This injection may proceed in different manners. Thus, it is possible that the injected fuel cloud is at the spark plug already during, or immediately after the injection, and is ignited by it. It is also possible that the injected fuel cloud is supplied to the spark plug by a charge movement, and is only then ignited. In the case of both combustion methods there is no uniform fuel distribution, but rather a stratified charge.

Stratified operation may provide that, using a very slight quantity of fuel, the smaller loads present are able to be performed by the internal combustion engine. Greater loads, however, may not be handled by stratified operation.

In the homogeneous operation provided for such greater loads, the fuel is injected during an intake stroke of the internal combustion engine, so that a turbulence and thereby a distribution of the fuel is still able to occur in the combustion chamber right away before the ignition of the fuel/air mixture. To that extent, homogeneous operation corresponds approximately to the operating manner of internal combustion engines in which, in the usual manner, fuel is injected into the intake pipe. If necessary, one may also switch over to homogeneous operation for smaller loads.

In stratified operation, the throttle valve in the intake pipe leading to the combustion chamber is opened wide, and combustion is controlled and/or regulated only by the fuel quantity to be injected. In homogeneous operation, the throttle valve is opened and closed as a function of the required torque, and the fuel quantity to be injected is controlled and/or regulated as a function of the aspirated air mass. In both operating modes, that is, in stratified operation and in homogeneous operation, the fuel quantity to be injected is also controlled and/or regulated as a function of a multitude of additional operating variables towards an optimal value with respect to fuel savings, exhaust gas reduction and the like. In this context, the control and/or regulation is different for the two operating modes.

Also known in the art are internal combustion engines, in which fuel is injected into the combustion chambers of the internal combustion engine, not by a single injection, but subdivided into several consecutive injections, especially by a main injection and a subsequent postinjection. For example, an internal combustion engine is described in published European Patent Application No. 0 971 104, in which the fuel is injected into the combustion chambers by a postinjection during an exhaust stroke of the internal combustion engine, that is, clearly after the ignition time of a fuel/air mixture. The fuel quantity injected by the postinjection arrives unburned in a catalytic converter of the internal combustion engine, and is ignited there. This leads to heating of the catalytic converter, so that temperatures required for the regeneration of the catalytic converter may be achieved in the catalytic converter.

Internal combustion engines having direct fuel injection, in partial-load operation may not be driven steadily in thermodynamically optimal, throttle-free, quality-controlled stratified operation. In order, for example, to ensure an effective fuel tank venting or an efficient regeneration of a nitrogen oxide ($NO_x$) catalytic converter, at certain time intervals (depending on the engine speed and the load state of internal combustion engine), a throttling of the intake air of internal combustion engine and a stoichiometric ($ë=1$) or substoichiometric ($ë<1$) fuel/air ratio connected therewith has to be set. As soon as the air intake supply is throttled, the fuel has to be injected during the intake stroke and not—as in the (throttle-free) stratified charge operation—during the compression stroke. The internal combustion engine then behaves, with respect to fuel usage and exhaust gas emission, like a conventional internal combustion engine having manifold injection.

It is known from other systems that, during the special functions described above, fuel tank venting, catalytic converter regeneration or others, one may inject the fuel, within the scope of a one-time injection in the intake stroke. Displacing the injection time into the compression stroke, in conjunction with extreme air intake throttling, causes very great soot emission, and is therefore not used in practice.

However, when the internal combustion engine is operated using extreme intake air throttling and stoichiometric mixture composition, the spray orifices of the injectors coke up, with the effect that, after a certain running time of the internal combustion engine the injection time has to be permanently increased, so that, at a predefined load, the fuel supply may be held constant. By increasing the injection time tq it is achieved that the time cross section $((dm/dt)*tq)$ for the fuel supply per work cycle remains unchanged.

Although the special functions for fuel tank venting and catalytic converter regeneration are only activated for a short time, it is ensured that the coking up of an injector valve, that is, a spray orifice internal coking creating flow interference, has to be avoided in this operating phase under all circumstances. Otherwise the injection time has to be increased above the limits of the application, after a longer operating duration.

Therefore the present invention effectively avoids injector orifice internal coking of the spray orifices of a fuel injector, especially at high air intake throttling and stoichiometric or substoichiometric mixture composition.

In order to achieve this, the present invention provides that the predominant proportion of the entire fuel quantity is injected by the main injection, and a change in the torque developed by the internal combustion engine is controlled and/or regulated exclusively via a change in the injection time during the main injection, and the fuel is injected by the main injection and the subsequent postinjection before the ignition time of a fuel/air mixture.

SUMMARY

According to the present invention, by a subdivision of the injection pulse into a plurality of injection pulses, injector orifice internal coking of a fuel injector, e.g., of a multi-orifice fuel injector, may effectively be avoided. In addition, due to the split-up injection, combustion having a favorable efficiency sets in, which is shown by the exhaust gas temperature being clearly lower compared to when there is single injection.

Combustion of a fuel/air mixture, at great underpressure and having stoichiometric mixture composition, has great wall heat losses from heating up the combustion chamber walls, and, consequently, also the injection elements. Those regions are heated which are directly exposed to the combustion. On account of the heat of combustion, high-boiling deposits are created at the inner walls of the spray orifices, which are no longer able to be completely burned. One may assume that, during the combustion stroke the flame front engages the valve tip region, but that the combustion reactions in the spray orifice region are greatly slowed down, since a rich mixture is present there, and the flame is extinguished at the cooler wall zones.

According to the present invention, a second and each additional injection of fuel into the combustion chamber is able to reduce the deposits of the high-boiling fuel components on the inside of the spray orifices of the fuel injector. On account of the second injection, the inside contour of the spray orifice region is blown free of the deposit of fuel condensate that occurred before. Besides that, in response to a second injection pulse, the fuel is pressed into the injector since, for example, the fuel column in the fuel injector has to be injected against the compression pressure in the combustion chamber. This causes a saturated wall deposit of the fuel which does not have separation tendencies, whereby heat convection and valve inside cooling are greatly improved, and the separation of the fuel into highly volatile and difficultly volatile fuel components is prevented. The fuel is injected with its additives almost completely into the combustion chamber. Due to the suppressed separation, no partially reacted combustion residues then form on the inside of the spray orifices.

According to an exemplary embodiment of the present invention, it is provided that, during the postinjection, exactly so much fuel is injected that a valve needle of the fuel injector just still touches a lift stop, and thereafter immediately closes again. Thereby, the quantity of the postinjection is tightly limited time-wise. For this reason, a change in the torque developed by the internal combustion engine is controlled and/or regulated exclusively via a change in the injection time during the main injection.

According to an exemplary embodiment of the present invention, it is provided that the main injection be performed during an intake stroke of the internal combustion engine, and the at least one postinjection be performed during a compression stroke of the internal combustion engine. The main injection may be released as early as shortly after the gas-exchange-OT (top dead center), and should be concluded at the latest shortly before the successive UT (bottom dead center). The injection position of the main injection depends first of all on the shape of the combustion chamber. Into combustion chambers including characteristic piston recesses, injection may be made shortly after the gas-exchange top dead center, since the piston-recess edge (uncritical with respect to washing out motor oil) and less so the cylinder wall are wetted, and in addition more time is available for mixture preparation. However, in combustion chambers including flat pistons, one may inject in the range of the top piston speed, since in this phase the aspirated air reaches its greatest flow speed, and thus the mixing of fuel and air would be most intensive.

According to an exemplary embodiment of the present invention, the main injection is made during a maximum speed of a piston of the internal combustion engine, the piston marking the boundary of a combustion chamber of the internal combustion engine into which fuel is injected. The area around the main injection may lie around 270° KW (crankshaft angle) before the ignition top dead center.

The at least one postinjection is made after a predefinable compression pressure level is reached in a combustion chamber of the internal combustion engine into which fuel is injected. In addition to that, the postinjection should occur shortly before the ignition time. The earliest possible beginning of injection for the postinjection thus depends also on the absolute value of the current cylinder pressure. The postinjection may be performed at an absolute air intake pressure of about 400 mbar and a compression pressure level in one combustion chamber of >2 bar. The data are exemplary for an operating result. It is important that the second injection occur after the mixture from the first injection has already condensed due to the increase in the compression pressure.

The method according to the present invention may be used for avoiding injector orifice internal coking of spray orifices of fuel injectors in an internal combustion engine.

The present invention also relates to a computer program that is suitable for performing the method according to the present invention when the program is executed on a computing element, e.g., on a microprocessor. The computer program may be stored on a storage element, e.g., on a flash memory.

The method according to the present invention may be implemented in the form of a memory element which is provided for a control unit of a direct injection internal combustion engine, e.g., in a motor vehicle. In this context, a computer program that is executable on a computing element, e.g., on a microprocessor, and is programmed for performing the method according to the present invention, is stored on the memory element. In this case, the present invention is therefore implemented by manner of a computer program stored on the storage element, so that this storage element provided with the computer program constitutes the present invention in the same manner as the method for whose implementation the computer program is suitable. In particular, an electrical storage medium, for example, a read-only memory, a random-access memory, or a flash memory, may be used as the memory element.

According to another exemplary embodiment of the present invention, the control unit controls the fuel injector in such a manner that the fuel injector injects the predominant proportion of the entire fuel quantity to be injected, by the main injection, and the control unit controls and/or regulates a change in the torque developed by the internal combustion engine exclusively via a change in the injection time during the main injection, the control unit controlling the fuel injector in such a manner that the fuel injector injects the fuel by the main injection and the at least one subsequent postinjection before the ignition time of a fuel/air mixture.

DETAILED DESCRIPTION

Figure 1:
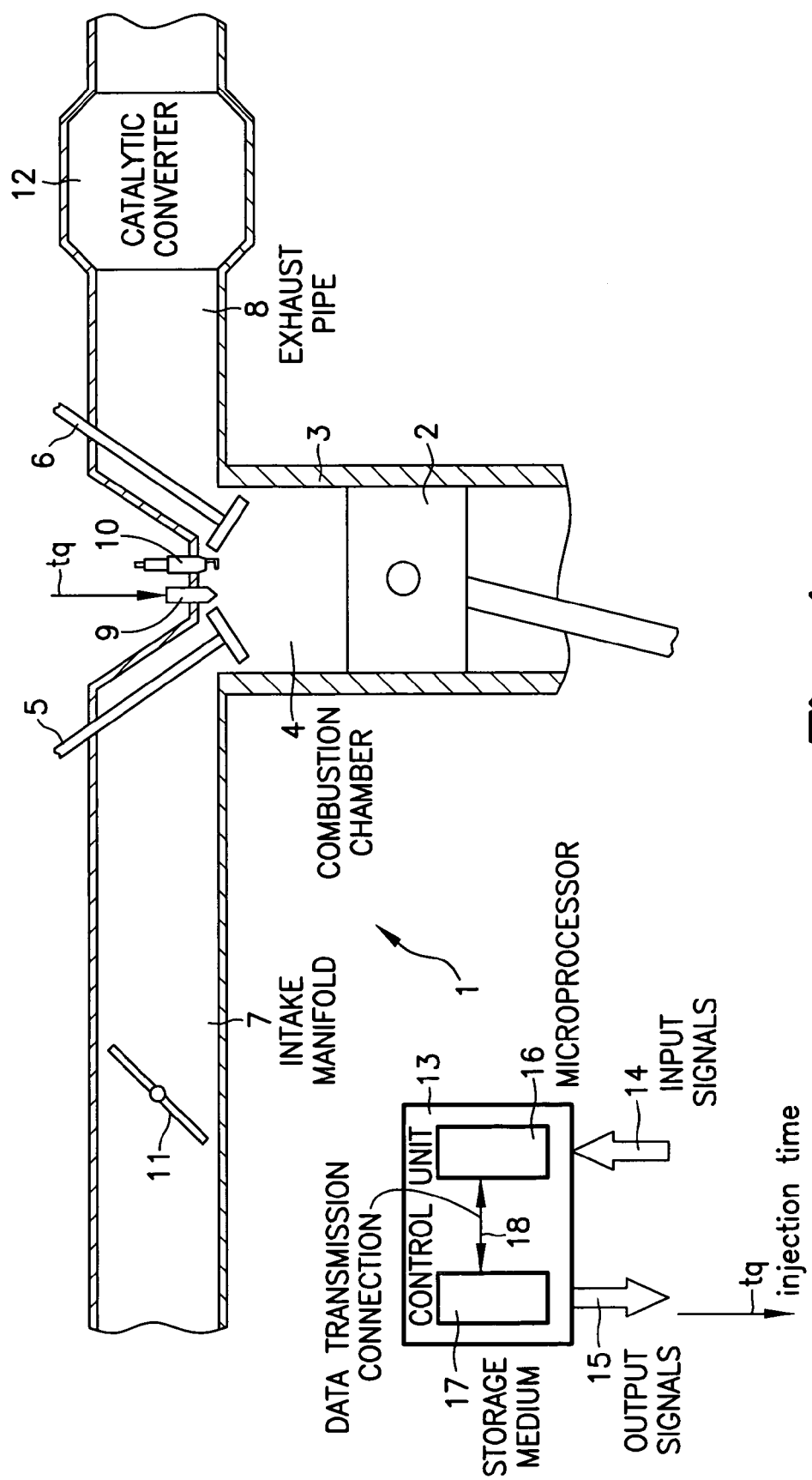
FIG. 1 shows a direct injection internal combustion engine in which the method according to the present invention is able to be applied.

FIG. 1 shows an internal combustion engine 1 of a motor vehicle, in which a piston 2 may be moved back and forth in a cylinder 3. Cylinder 3 is provided with a combustion chamber 4, whose boundary is marked by, among other things, piston 2, an intake valve 5, and an exhaust valve 6. An intake manifold 7 is connected to intake valve 5, and an exhaust pipe 8 is connected to exhaust valve 6.

In the region of intake valve 5 and of exhaust valve 6, there project into combustion chamber 4 a fuel injector 9 (a so-called injector) configured as a multi-orifice fuel injector and a spark plug 10. Fuel is able to be injected into combustion chamber 4 via injector 9. The fuel in combustion chamber 4 may be ignited by spark plug 10.

A rotatable throttle valve 11, through which air may be supplied to intake manifold 7, is accommodated in intake manifold 7. The quantity of supplied air is a function of the angular setting of throttle valve 11. In exhaust pipe 8 a catalytic converter 12 is accommodated, which is used for cleaning the exhaust gases created by the combustion of the fuel.

Piston 2 is set into back and forth motion by combustion of a fuel/air mixture in combustion chamber 4, which is transmitted to a crank shaft (not shown) and exerts a torque upon it.

A control unit 13 receives input signals 14 representing operating variables of internal combustion engine 1 measured by sensors. For instance, control unit 13 is connected to an air mass sensor, a lambda sensor, an engine speed sensor or the like. Moreover, control unit 13 is connected to an accelerator sensor which generates a signal that indicates the setting of an accelerator operated by the driver, and thus gives the torque that is called for. Control unit 13 generates output signals 15, using which the behavior of internal combustion engine 1 may be influenced, via actuators or setters. For instance, control unit 13 is connected to fuel injector 9, spark plug 10 and throttle valve 11, or the like, and generates the signals required for their control.

Among other things, control unit 13 is provided for controlling and/or regulating the operating variables of internal combustion engine 1. For example, the fuel mass (via injection time tq) that is injected by fuel injector 9 into combustion chamber 4, and the point in time of the fuel injection are controlled and/or regulated by control unit 13, e.g., with respect to a low fuel usage, a low exhaust gas emission and/or a low noise emission. To this end, control unit 13 is equipped with a microprocessor 16, which, in a storage medium 17 that is, for example, developed as a flash memory, has a computer program stored, that is suitable for execution of the control and/or regulation. For the execution of the computer program stored in storage medium 17, it is transmitted as a whole, or as instructed, via a data transmission connection 18 to microprocessor 16.

Internal combustion engine 1 from FIG. 1 is able to be operated in a plurality of different operating settings. Thus, it is possible to operate internal combustion engine 1 in an homogeneous operation, a stratified operation, a homogeneous lean operation or the like.

In homogeneous operation, the fuel is injected during an intake stroke by fuel injector 9 directly into combustion chamber 4 of internal combustion engine 1. On account of the relatively early injection, the fuel is made strongly turbulent right up to ignition, so that, in combustion chamber 4 a fuel/air mixture is created that is homogeneous. In this context, the torque to be produced is set by control unit 13 via the setting of throttle valve 11. In homogeneous operation, the operating variables of internal combustion engine 1 are controlled and/or regulated in such a manner that ë (the ratio of air quantity supplied to the fuel mass supplied) is equal to one. Homogeneous operation is used especially at full load.

Homogeneous lean operation corresponds to a great extent to homogeneous operation, however, ë is set to a value >1.

In stratified operation, the fuel is injected during a compression stroke by fuel injector 9 directly into combustion chamber 4 of internal combustion engine 1. Accordingly, at ignition by spark plug 10, no homogeneous mixture is present in combustion chamber 4, but rather a fuel stratification. Apart from requirements such as an exhaust-gas recirculation and/or a gas tank venting, throttle valve 11 may be completely open, and internal combustion engine 1 may accordingly be operated in an unthrottled manner. The torque to be produced is set in stratified operation largely via the fuel mass ((dm/dt)*tq) injected into combustion chamber 4. Internal combustion engine 1 may be operated in stratified operation, e.g., when idling and at partial load.

One may switch over between the types of operation named of internal combustion engine 1. Such switchovers are performed by control unit 13.

Internal combustion engines 1 having direct fuel injection, in partial-load operation may not be driven steadily in thermodynamically optimal, throttle-free, quality-controlled stratified operation. In order, for example, to ensure effective fuel tank venting or an efficient regeneration of a nitrogen oxide ($NO_x$) catalytic converter 12, at certain time intervals (depending on the engine speed and the load state of internal combustion engine 1), a throttling of the intake air of internal combustion engine 1 and a stoichiometric or substoichiometric (ë<1) fuel/air ratio connected therewith has to be set. As soon as the air intake supply is throttled, the fuel has to be injected during the intake stroke and not—as in the (throttle-free) stratified charge operation—during the compression stroke. Internal combustion engine 1 then behaves, with respect to fuel usage and exhaust gas emissions, like a conventional internal combustion engine having manifold injection.

During operation of internal combustion engine 1 using extreme intake air throttling and stoichiometric mixture composition, the spray orifices of fuel injector 9 coke up, it is true, e.g., in response to the injection of fuel during the intake stroke, with the effect that, after a certain running time, injection time tq has to be increased permanently by control unit 13, in order to be able to hold fuel supply at a predefined load constant. The time cross section ((dm/dt*tq) for the fuel supply per work cycle thus remains unchanged.

Even though the special functions such as gas tank venting or catalytic converter regenerating are activated for only a short time period, it has to be ensured that an injector orifice internal coking of the spray orifices of fuel injector 9 and a therewith connected flow rate interference are avoided under all circumstances, since otherwise injection time tq has to be increased above the application limits over a longer operating period.

According to the present invention, a method for avoiding injector orifice internal coking of the spray orifices of fuel injector 9 is provided, in which the fuel is injected by multiple injection, especially by a double injection subdivided into a first main injection and a subsequent postinjection, into combustion chamber 4 of internal combustion engine 1. Thereby, injector orifice internal coking may be effectively prevented, especially at high air intake throttling and stoichiometric or substoichiometric mixture composition.

In the main injection, the predominant proportion of the entire fuel mass to be injected is injected, whereas, during postinjection, only so much fuel is injected that a valve needle of fuel injector 9 just still touches a lift stop, and thereafter closes again immediately. Thereby the quantity of the postinjection is tightly limited time-wise. A possible change in the torque developed by the internal combustion engine is therefore controlled and/or regulated exclusively via a change in injection time tq during the main injection.

The best results are achieved, i.e. injector orifice internal coking is best able to be prevented if the main injection is performed during an intake stroke of internal combustion engine 1 and the postinjection is performed during a compression stroke of internal combustion engine 1. The main injection may be released as early as shortly after the gas-exchange-OT (top dead center), and should be concluded at the latest shortly before the successive UT (bottom dead center). The center of mass of the main injection may be shifted into the region of maximum speed of piston 2 by approximately 270° KW (crankshaft angle) before ignition dead center. The injection position of the main injection depends first of all on the shape of combustion chamber 4. Into combustion chambers including characteristic piston recesses, injection may be made shortly after the gas-exchange top dead center, since the piston recess edge (uncritical with respect to washing out motor oil) and less so the wall of cylinder 3 are wetted, and in addition more time is available for mixture preparation. In combustion chamber 4 including flat pistons 2, one may inject in the range of the top piston speed of piston 2, since in this phase the aspirated air reaches its greatest flow speed, and thus the mixing of fuel and air would be most intensive.

The injection quantity of the postinjection is deposited in combustion chamber 4, between the achieving of a predefinable compression pressure level in combustion chamber 4, and shortly before the time of ignition of the fuel/air mixture. The earliest possible beginning of injection of the postinjection thus depends on the amount of a certain cylinder pressure at the time of the beginning of injection.

Figure 2:
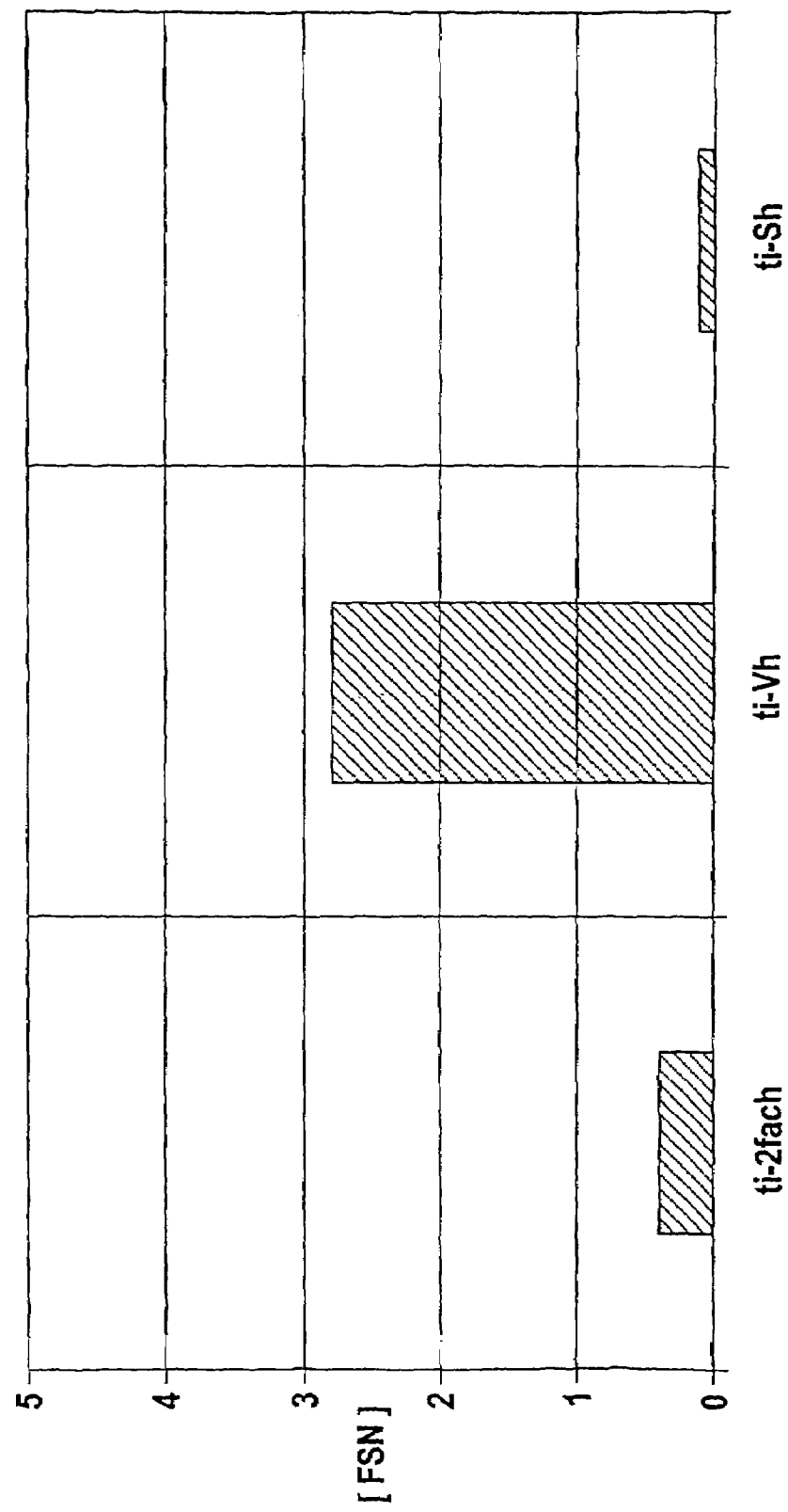
FIG. 2 shows a diagram illustrating the comparison of soot emissions in response to different injections of fuel into a combustion chamber of an internal combustion engine.

FIG. 2 shows a diagram having soot emissions for different kinds of fuel injection. The degree of soot emission may be given in FSN (filter smoke number). It may be clearly noted that the least soot emission occurs for a single injection pulse during the suction stroke (ti-Sh). A substantially higher soot emission occurs, on the other hand, in response to a single injection pulse during the compression stroke (ti-Vh). Upon subdivision of the injection pulse into a main injection pulse and a postinjection pulse, in accordance with the present invention (ti-2fach), a soot emission occurs which, to be sure, is somewhat greater than the soot emission in response to a single injection pulse during suction stroke (ti-Sh), but clearly below the soot emission of a single injection pulse during compression stroke (ti-Vh). This shows that the method according to the present invention, for avoiding injector orifice internal coking, results in almost no increase in soot emission.

Figure 3:
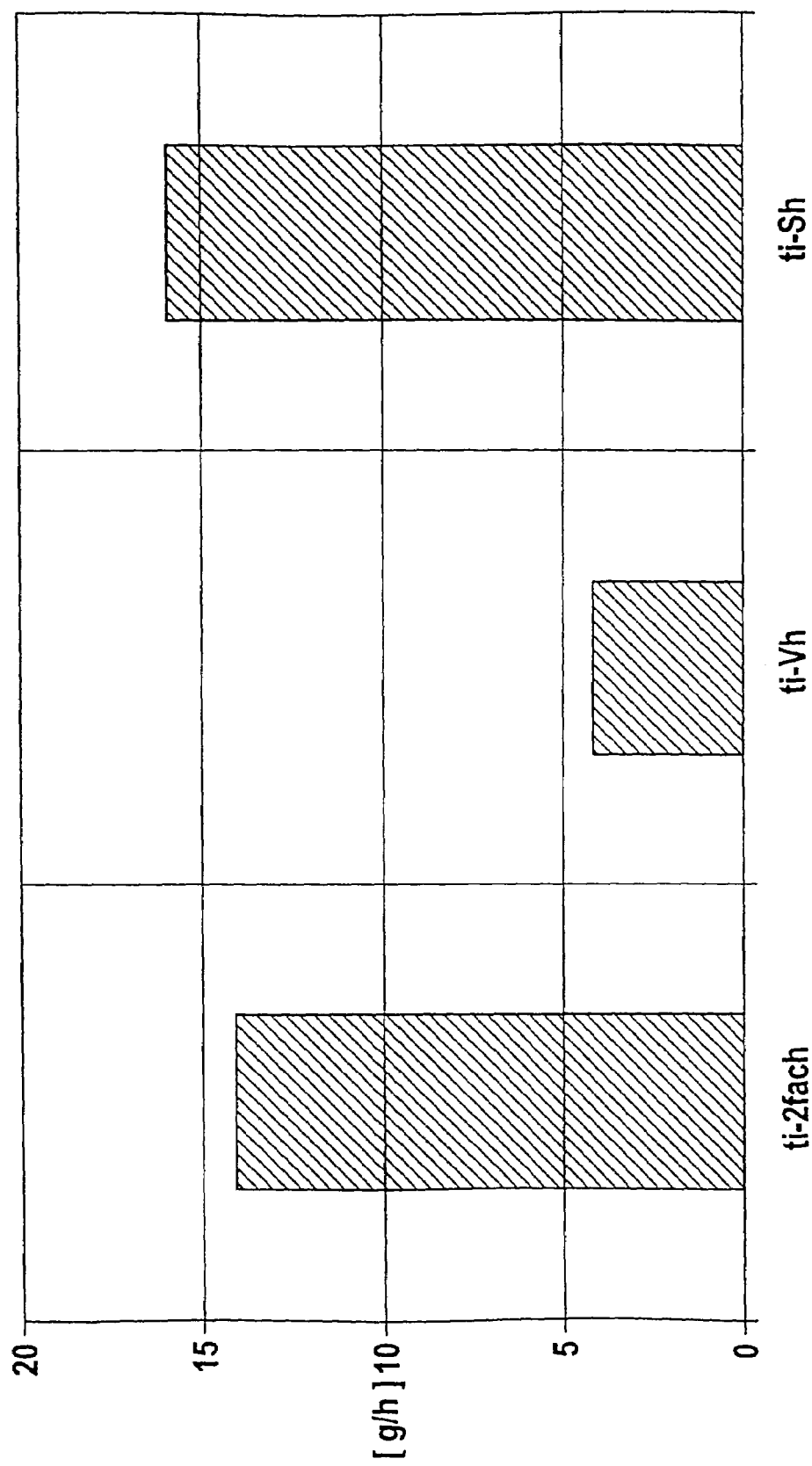
FIG. 3 shows a diagram illustrating the comparison of hydrocarbon emissions in response to different injections of fuel into a combustion chamber of an internal combustion engine.

FIG. 3 shows a diagram having hydrocarbon (HC) emissions for various kinds of fuel injection. It may be clearly seen that the least HC emissions occur in response to a single injection pulse during compression stroke (Ti-Vh), and the largest HC emissions occur in response to a single injection pulse during suction stroke (ti-Sh). In response to a subdivision of the injection pulse into a main injection pulse and a postinjection pulse, according to the present invention (ti-2fach), it is true that higher HC emissions occur than in response to a single injection pulse during compression stroke (ti-Vh), but lower HC emissions than in response to an injections pulse during suction stroke (ti-Sh). Thus the method according to the present invention leads to the avoidance of injector orifice internal coking and also to not excessively high HC emissions.

Figure 4:
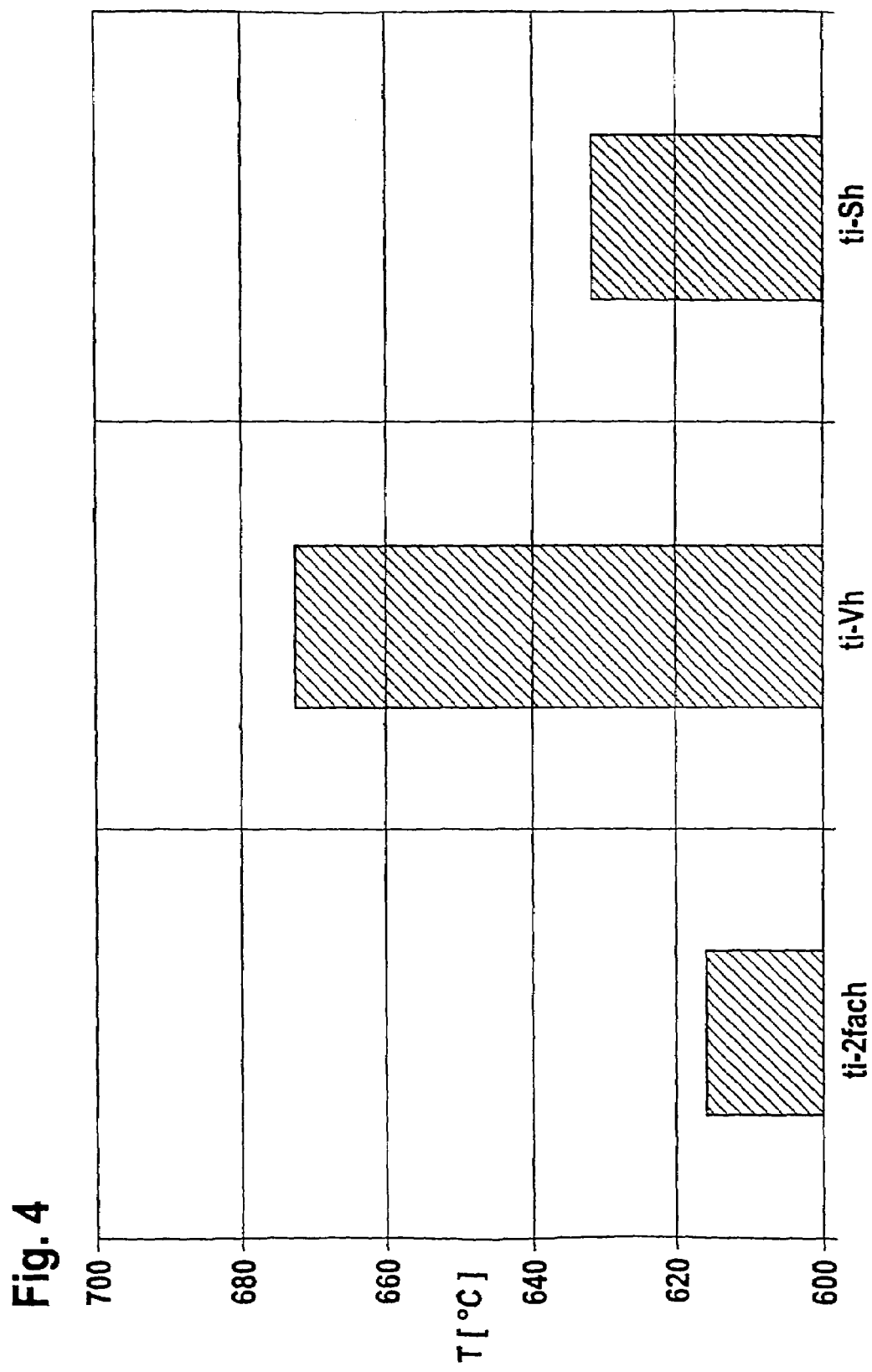
FIG. 4 shows a diagram illustrating the comparison of exhaust gas temperatures in response to different injections of fuel into a combustion chamber of an internal combustion engine.

FIG. 4 shows a diagram having exhaust gas temperatures T for various kinds of fuel injection. It may be clearly recognized that by far the highest exhaust gas temperatures of about 675° C. occur in response to a single injection pulse during compression stroke (ti-Vh). Somewhat lesser exhaust gas temperatures in the range of about 635° C. occur in response to a single injection pulse during suction stroke (ti-Sh). By far the lowest exhaust gas temperatures in the range of about 615° C., however, appear in response to an injection pulse subdivided into a main injection pulse and a postinjection pulse according to the present invention (ti-fach). The low exhaust gas temperatures point to a more complete combustion of the fuel in combustion chamber 4, and therewith to a high efficiency.

Figure 5:
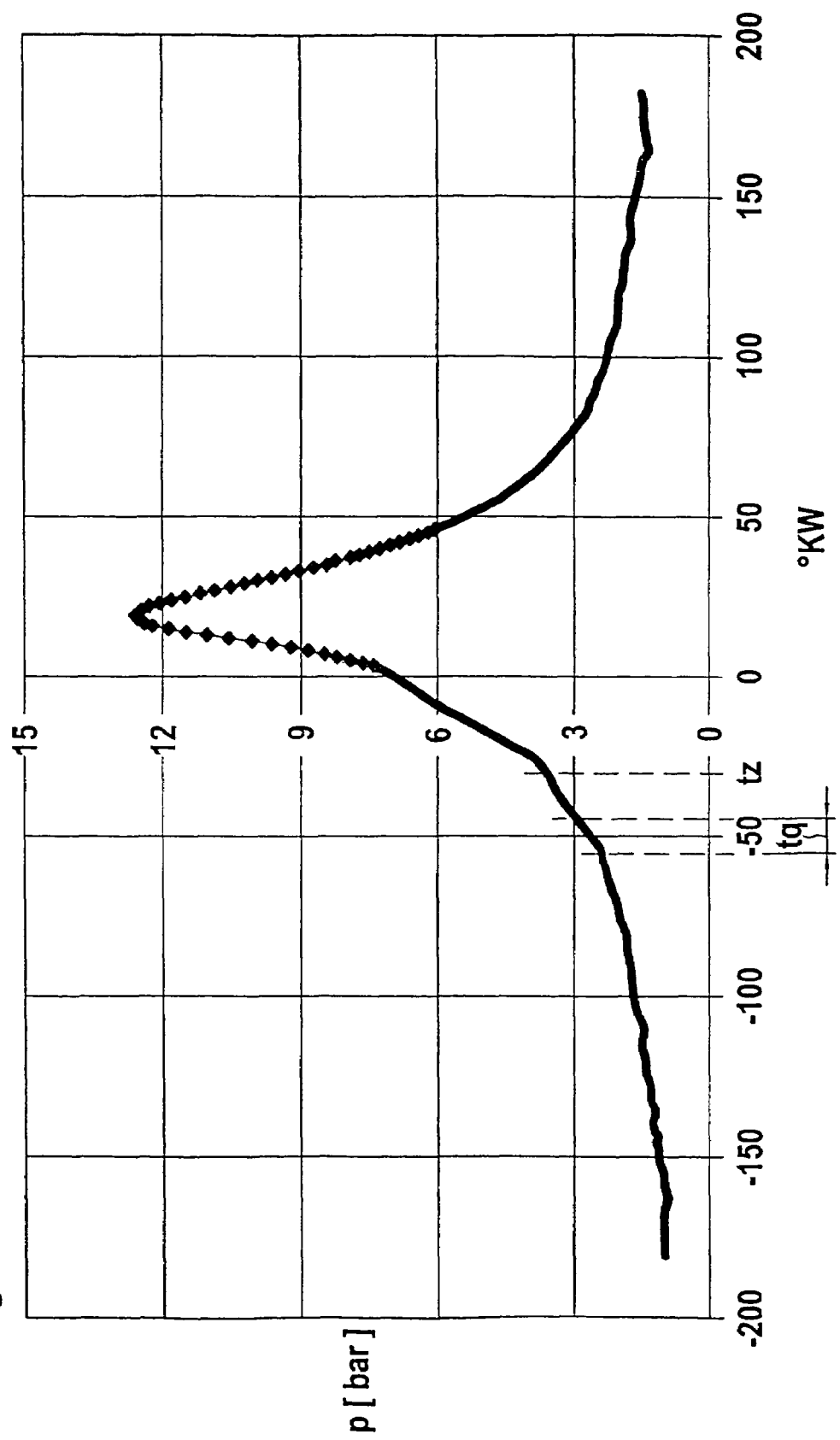
FIG. 5 shows a plot of a combustion pressure in a combustion chamber of an internal combustion engine in response to an air intake pressure of 400 mbar and an engine speed of 1800 rpm.

FIG. 5 shows a combustion pressure curve in combustion chamber 4, for an intake pipe pressure of about 400 mbar and a speed of internal combustion engine 1 of about 1,800 rpm as a function of the angular position of the crankshaft (° KW). The beginning of injection of the main injection was approximately 280° KW before ignition top dead center (0° KW). The injection time of the main injection amounted to about 1.3 ms. The beginning of injection of the postinjection is approximately 55° KW before ignition top dead center. In response to an ignition time tq of the postinjection of about 0.9 ms, the end of injection of the postinjection is about −45° KW before ignition top dead center. A common-rail pressure prevailing in a fuel metering system of internal combustion engine 1 was approximately 120 bar for the combustion curve shown in FIG. 5. Injection time $t_z$ is approximately at 30° KW before ignition top dead center.

Figure 6:
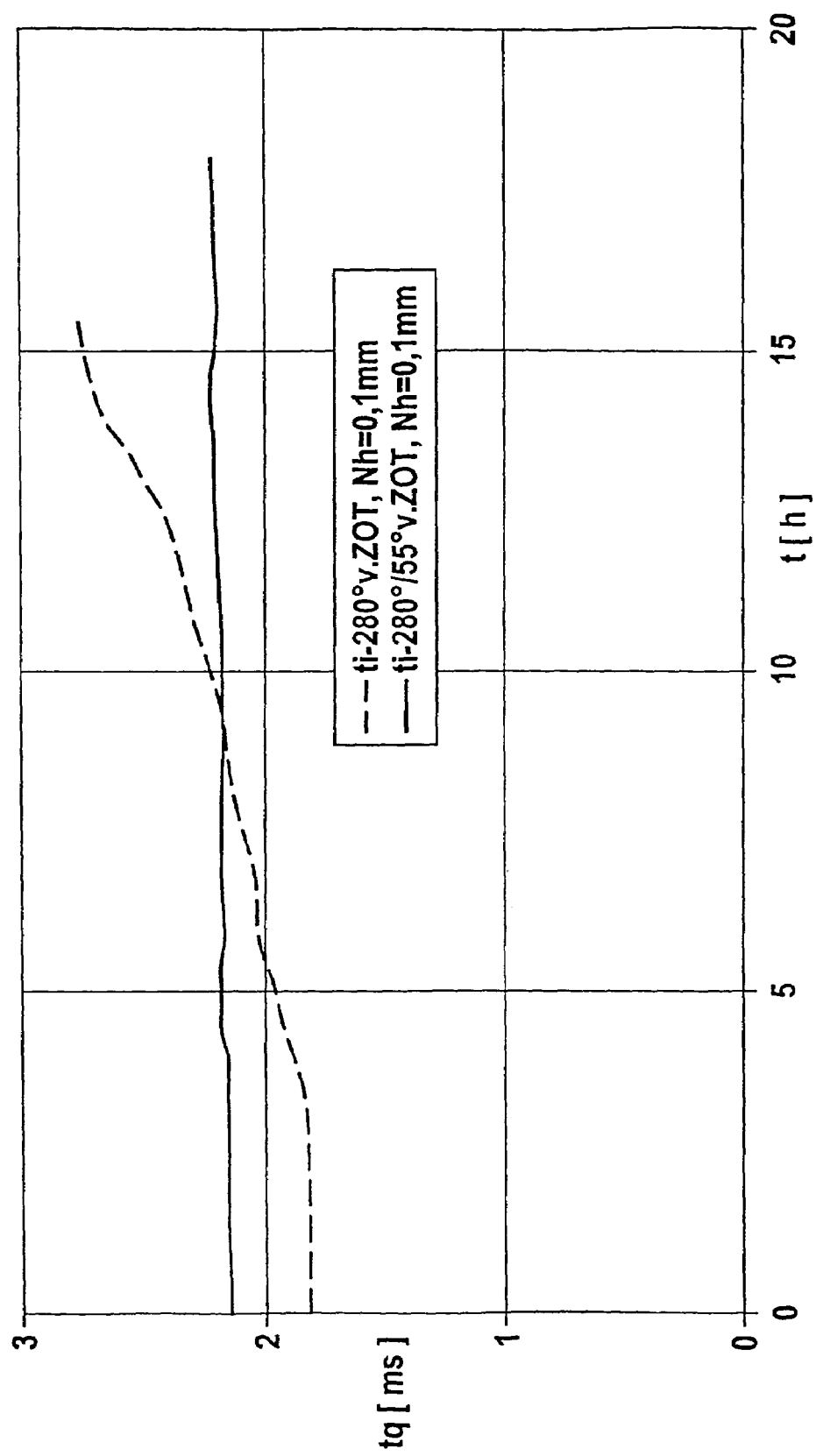
FIG. 6 shows a diagram illustrating the comparison of the injection times in response to a constant fuel quantity to be injected for different fuel injections.

FIG. 6 shows the curves of injection times for different kinds of fuel injection at constant engine load. Injection time tq that is to be set by control unit 13 is a measure of the degree of the injector orifice internal coking. The more the spray orifices of fuel injector 9 are clogged with deposits, the longer injection time tq has to be selected, in order to inject the same fuel mass into the reduced spray orifice diameter. The curve of injection time tq for a single injection pulse known from other systems is shown in a dashed line in FIG. 6. The injection beginning is approximately 280° KW before the ignition top dead center. It may be clearly recognized that injection time tq increases, during the course of an approximately 15 hour operating time, from a beginning reading of 1.7 ms to about 2.6 ms after 15 hours duration of the experiment. The curve of injection time tq for the method according to the present invention, in which the fuel injection is subdivided into a main injection and a postinjection, is shown by a solid line. The beginning of the main injection is at about 280° KW, and the beginning of the postinjection is at 55° KW before ignition top dead center. In response to an injection pulse subdivided into a main injection pulse and a postinjection pulse, injection time tq remains nearly constant. During an operating duration of about 18 hours, injection time tq went up only a very little from about 2.2 ms to about 2.3 ms, after 18 hours. In FIG. 6, Nh denotes the valve lift of fuel injector 9, which was selected the same size at 0.1 mm.

The subdivision of an injection pulse into a main injection pulse and a postinjection pulse is not only used to avoid the spray orifice internal deposits, but also leads to stabilization of combustion in combustion chamber 4. If injection is made exclusively in suction stroke (ti-Sh), HC emission (cf FIG. 3) increases, accompanied by greater fluctuations in the combustion pressure. If the injection occur exclusively in the compression stroke (ti-Vh), soot emission rises (cf FIG. 2) and after a certain running time, shunting forms at spark plug 10 having all sorts of undesired side effects, such as ignition misfires, because the insulating ceramic is contaminated with soot.

With the aid of the injection divided into two parts, according to the present invention (ti-2fach), a good compromise could also be found with respect to the problem just mentioned, to be sure, having a moderate increase in soot, but reduced HC emission, in conjunction with a more stable long time running behavior compared to single injection during suction stroke (ti-Sh).

By endoscopy exposures in combustion chamber 4, serious differences are recognizable in the forming of the injection jets between the injection in suction stroke (ti-Sh) and the injection in compression stroke (ti-Vh). Due to the great underpressure in intake pipe 7, the fuel experiences intensive evaporation (sucking out of the spray orifices of fuel injector 9) during the injection in intake stroke (ti-Sh). This fuel evaporation already occurs on the inside of fuel injector 9, in regions where the vapor pressure is undershot, conditioned upon the underpressure in cylinder 3.

In the subsequent compression phase, the fuel vapor condenses and deposits on the inner walls of the spray orifices of fuel injector 9. The combustion with strong underpressure and stoichiometric mixture composition has great wall temperature losses by heating up the walls of combustion chamber 4, and consequently also of the injection elements, above all of those regions which are directly submitted to the combustion. On account of the heat of combustion, high-boiling deposits are finally created at the inner walls of the spray orifices, which are no longer able to be completely burned. In the combustion phase the flame front engages the tip region of fuel injector 9; however, the combustion reactions in the spray orifice region are greatly slowed down, since there a rich mixture is present (wall wetting by the condensate) and the flame is extinguished at the cooler wall zones.

On account of the second injection, before ignition time tz within the meaning of the present invention, the inside contour of the spray orifice region is blown free of the deposit of fuel condensate that occurred before.

In addition, in response to the second injection pulse, the fuel is no longer sucked out of fuel injector 9, by downwards moving piston 2 (underpressure) but is, on the contrary, more likely pressed into fuel injector 9 by piston 2's upward motion (overpressure). The fuel column in fuel injector 9 has to be injected counter to the compression pressure. Thereby, there occurs a saturated wall deposit of the fuel in the spray orifices without tendencies to separate, heat convection and valve internal cooling are greatly improved, and separation into highly volatile and difficultly volatile fuel components is prevented. The fuel is injected with its additives almost completely into combustion chamber 4. On account of the suppressed separation, there is then also no formation of partially reacted combustion residues which deposit on the inner sides of the spray orifices.

What is claimed is:

1. A method for operating a direct injection internal combustion engine of a motor vehicle, comprising:
    injecting a fuel by a fuel injector in a main injection and a subsequent injection into a combustion chamber of the internal combustion engine;
    wherein the main injection is a predominant proportion of an entire fuel quantity injected in an injection cycle, and wherein a change in a torque produced by the internal combustion engine is regulated by a change in injection time during the main injection, and wherein the fuel is injected by the main injection and the subsequent injection before an ignition time of a fuel/air mixture.

2. The method of claim 1, wherein a selected quantity of fuel is injected during the subsequent injection so that a valve needle of the fuel injector still touches a lift stop and thereafter immediately closes again.

3. The method of claim 1, wherein the main injection is performed during an intake stroke of the internal combustion engine and the subsequent injection is performed during a compression stroke of the internal combustion engine.

4. The method of claim 1, wherein the main injection is performed during a maximum speed of a piston of the internal combustion engine, and wherein the piston defines a boundary of the combustion chamber of the internal combustion engine into which the fuel is injected.

5. The method of claim 1, wherein-the subsequent injection is made after a predefined compression pressure level is reached in the combustion chamber of the internal combustion engine into which the fuel is injected.

6. The method of claim 5, wherein the subsequent injection is performed at an absolute pressure of about 400 mbars in an intake manifold to the combustion chamber of the internal combustion engine into which the fuel is injected, and at a compression pressure level of over 2 bars in the combustion chamber.

7. The method of claim 1, whereby internal coking of an injector orifice of a spray orifice of the fuel injector is prevented.

8. A storage medium for storing a computer program for a control unit of a direct injection internal combustion engine of a motor vehicle, the computer program configured to be executed by a computing element of the control unit, the computer program having program codes for controlling the direct injection internal combustion engine of the motor vehicle in accordance with a method comprising:
    injecting a fuel by a fuel injector in a main injection and a subsequent injection into a combustion chamber of the internal combustion engine;

wherein the main injection is a predominant proportion of an entire fuel quantity injected in an injection cycle, and wherein a change in a torque produced by the internal combustion engine is regulated by a change in injection time during the main injection, and wherein the fuel is injected by the main injection and the subsequent injection before an ignition time of a fuel/air mixture.

9. The storage medium of claim 8, wherein the storage medium includes at least one of a read-only memory, a random access memory and a flash memory, and wherein the computing element includes a microprocessor.

10. A control unit for a direct injection internal combustion engine of a motor vehicle, the internal combustion engine including at least one combustion chamber and a fuel injector, the control unit comprising:

an arrangement configured to control the fuel injector so that the fuel injector injects into the at least one combustion chamber of the internal combustion engine a main injection and a subsequent injection of fuel;

wherein the main injection is a predominant proportion of an entire fuel quantity injected in an injection cycle, and the arrangement controls a change in a torque produced by the internal combustion engine by a change in an injection time during the main injection, and wherein the arrangement controls the fuel injector to inject the main injection and the subsequent injection before an ignition time of a fuel/air mixture.

* * * * *